(12) United States Patent
Marinier

(10) Patent No.: US 7,233,287 B2
(45) Date of Patent: Jun. 19, 2007

(54) METHOD AND SYSTEM FOR POSITIONING MOBILE UNITS BASED ON ANGLE MEASUREMENTS

(75) Inventor: Paul Marinier, Brossard (CA)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/202,560

(22) Filed: Aug. 12, 2005

(65) Prior Publication Data

US 2005/0288037 A1 Dec. 29, 2005

Related U.S. Application Data

(63) Continuation of application No. 10/806,701, filed on Mar. 23, 2004, now Pat. No. 6,933,890, which is a continuation of application No. 10/308,476, filed on Dec. 3, 2002, now Pat. No. 6,768,459.

(60) Provisional application No. 60/399,782, filed on Jul. 31, 2002.

(51) Int. Cl.
*H04Q 7/20* (2006.01)

(52) U.S. Cl. ............... 342/463; 342/442; 342/457

(58) Field of Classification Search ............... 342/442, 342/450, 457, 463, 465; 455/456.2, 456.3, 455/456.6
See application file for complete search history.

(56) References Cited

U.S. PATENT DOCUMENTS 4,057,803 A    11/1977  Coleman
4,910,526 A    3/1990   Donnangelo et al.
6,249,252 B1   6/2001   Dupray
6,314,304 B1   11/2001  Uesugi
6,459,903 B1   10/2002  Lee
6,580,393 B2 * 6/2003   Holt ........................... 342/453
2001/0049295 A1 12/2001 Matusuoka et al.
2002/0039912 A1 4/2002  Yamaguchi et al.
2003/0114169 A1 6/2003  Okamura et al.
2003/0129996 A1 * 7/2003 Maloney et al. ............ 455/456
2003/0181163 A1 9/2003  Ofuji et al.
2004/0198386 A1 * 10/2004 Dupray .................... 455/456.1
2004/0266457 A1 * 12/2004 Dupray .................... 455/456.5

FOREIGN PATENT DOCUMENTS

| CN | 128600 | 1/1998 |
| EP | 1193990 | 4/2002 |
| JP | 2000244968 | 8/2000 |

\* cited by examiner

*Primary Examiner*—Dao L. Phan
(74) *Attorney, Agent, or Firm*—Volpe & Koenig, P.C.

(57) ABSTRACT

A method and system for positioning mobile units using angle measurements taken by neighboring mobile units is disclosed. A selected mobile unit and mobile units in the vicinity of the selected mobile unit are selectively instructed to measure and report information related to the position of the selected mobile unit. The reported information is used to compute a position of the selected mobile unit.

10 Claims, 2 Drawing Sheets

US 7,233,287 B2

METHOD AND SYSTEM FOR POSITIONING MOBILE UNITS BASED ON ANGLE MEASUREMENTS

CROSS REFERENCE TO RELATED APPLICATION

This application is a continuation of U.S. patent application Ser. No. 10/806,701 filed on Mar. 23, 2004 now U.S. Pat. No. 6,933,890, which in turn claims priority from U.S. Continuation application Ser. No. 10/308,476 filed on Dec. 3, 2002 now U.S. Pat. No. 6,768,459, which in turn claims priority form U.S. Provisional Application No. 60/399,782 filed Jul. 31, 2002, which is incorporated by reference as if fully set forth.

BACKGROUND

The invention relates to mobile radio-communication systems and more particularly to the positioning of mobile units.

In prior art systems, base stations are equipped with smart antennas. Currently, the most advanced smart antenna is an adaptive antenna which may also be referred to as an adaptive array antenna. Adaptive array antennas facilitate the measuring of a direction of a of an incoming signal. Such antennas also enable the device to which they are connected to control the direction in which signals are transmitted thereby optimizing the power required for signal transmission.

Adaptive array antennas are often used to obtain positioning information regarding the location of mobile units. Multipath, however, between a mobile unit and a base station often results in inaccurate positioning of mobile units. Where multipath is present, either at the mobile unit or the base station or both, accurate positioning of mobile units is often difficult or impossible to measure.

It would therefore be desirable to accurately position mobile units despite the presence of multipath and to more accurately position mobile units where multipath is not present.

SUMMARY

The invention is a method and system for positioning mobile units using angle measurements taken by neighboring mobile units. A selected mobile unit and mobile units in the vicinity of the selected mobile unit are selectively instructed to measure and report information related to the position of the selected mobile unit. The reported information is used to compute a position of the selected mobile unit.

BRIEF DESCRIPTION OF THE DRAWING(S)

DETAILED DESCRIPTION OF THE PREFERRED EMBODIMENT(S)

In describing the present invention, the following assumptions are made. Mobile units may be equipped with adaptive antennas wherein the typical use of those units make them likely to operate in a known orientation in an elevation plane. The azimutal orientation of the array is not known a priori by the system. When a signal, such as an electromagnetic wave, for example, is incoming from a particular direction, it is possible to measure its direction of arrival (with respect to the antenna array axis) with an accuracy of 360/n degrees, where n is the number of elements of the array.

Further, when the present invention is implemented in a TDD system, there are periods of time where a mobile unit is not transmitting or receiving anything to/from the base station. Those periods of time are available for measuring the signals from other mobiles. Also, where the duplexing method is time-division, the same frequency band is used for both base-to-mobile and mobile-to-base communication.

Figure 1:
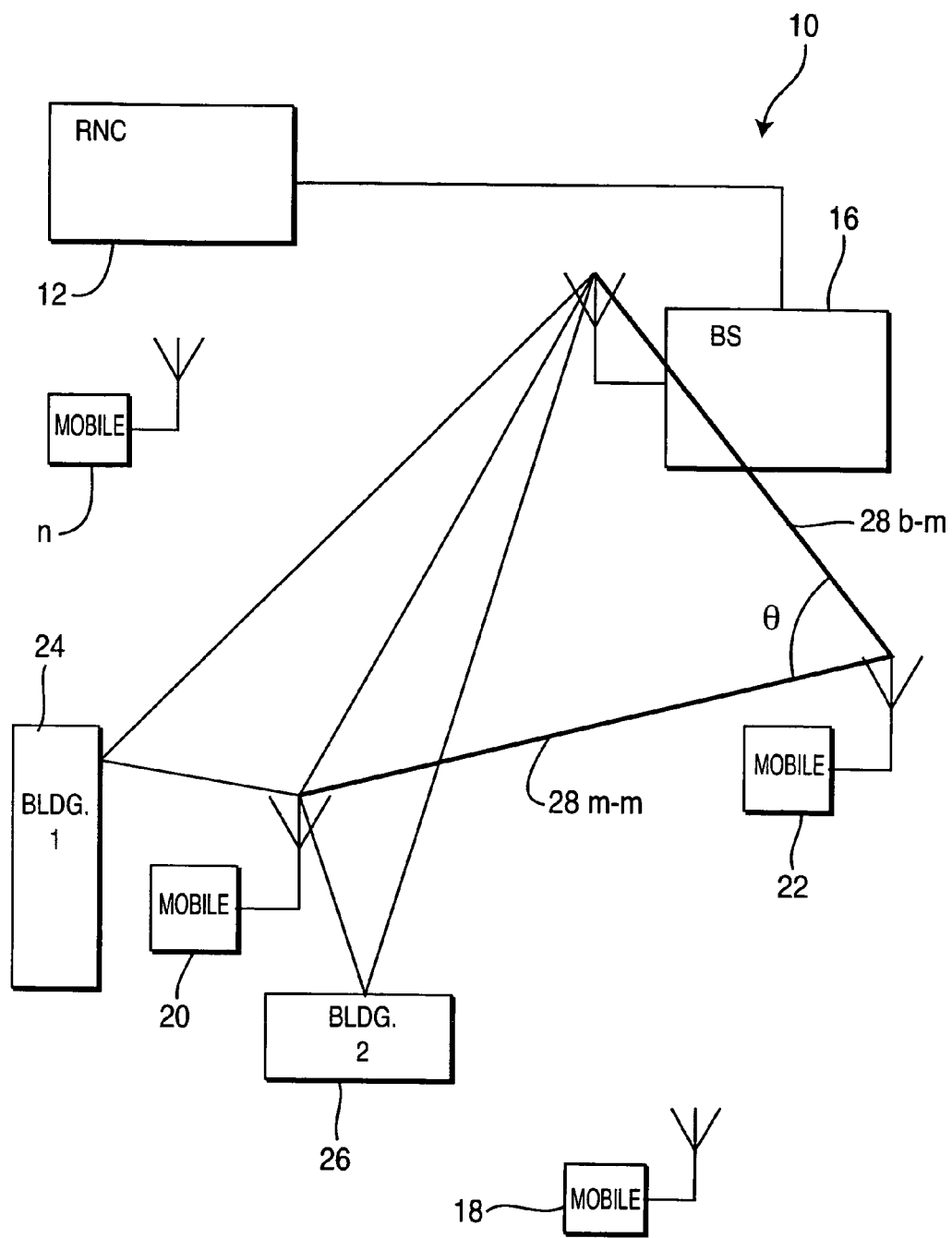
FIG. 1 is a system for positioning a mobile unit in accordance with an embodiment of the present invention.

Referring now to FIG. 1, typical radio-communication systems want to know the location of mobile units. In FIG. 1, there is shown a system 10 for accurately positioning mobile units. Multipath is shown at the mobile unit purely for purposes of describing the invention, as the invention works equally well where multipath is present at the base station or at both the mobile unit and the base station. The invention similarly provides increased accuracy when positioning mobile units where multipath is not present. The system 10 comprises a radio network controller 12, at least one base station 16, and a plurality of mobile units 18, 20, 22, n. Those skilled in the art will understand that the system 10 may comprise additional components as well as any number of radio network controllers, base stations, and mobile units, as desired.

In FIG. 1, the system 10 wants to determine the location of a particular mobile unit, say mobile unit 20 (i.e. the target mobile unit). The target mobile unit 20 is served by a known base station, say base station 16, which may or may not be equipped with adaptive antenna arrays. The known base station 16 is used by the system 10 to collect information regarding the position of mobile units 18, 20 22, n. The collected information is used by the system 10 to compute the location of the target mobile units 18, 20, 22, n. As those skilled in the art will understand, all relevant collected information related to the location of a particular mobile unit is compiled and used to compute the location of the mobile unit. Examples of the types of positioning information collected from mobile units are direction of arrival, amplitude, propagation delay, and degree of confidence.

In the situation shown in FIG. 1, however, the target mobile unit 20, despite being equipped with an adaptive antenna, is unable to accurately report a direction of arrival because of multipath caused by buildings 24, 26. Base station 16, in addition to serving the target mobile unit 20, also serves mobile units 18, 22, n. Therefore, where a mobile unit 20 cannot accurately report direction of arrival information because of multipath at the mobile unit 20, the requesting base station, or both, the system 10 can employ neighboring mobile units 18, 22, n. The neighboring mobile units 18, 22, n are instructed to measure and report information related to the target mobile unit's 20 position so that the radio network controller (RNC) 12, for example, may compute the target mobile unit's 20 position despite the target mobile unit's 20 inability to report accurate direction of arrival information.

The use of neighboring mobile units 18, 22, n may be triggered by either a target mobile unit 20 or a base station 16. For example, when the target mobile unit 20 is unable to measure a direction of arrival of a signal from a particular base station 16, the target mobile unit 20 may send an indication to the base station 16 instructing it to employ neighboring mobile units 18, 22, n to obtain positioning information concerning the target mobile unit 20. Similarly, the base station 16 may send periodic signals to all mobile units associated with base station 16 requesting direction of arrival measurements, or any type of positioning information. Where any one of those target mobile units fails to properly respond to the request, the system will employ neighboring mobile units 18, 22, n in order to position the target mobile unit 20 which fails to properly respond.

Neighboring mobile units 18, 22, n are preferably in the vicinity of the target mobile unit 20 in positions that are known by the system 10. Selecting neighboring mobile units 18, 22, n whose positions are known provides an accurate reference point by which to position target mobile unit 20. That is, generally speaking, in situations where positioning information provided by a target mobile unit 20 may be inaccurate or subject to confirmation, that target mobile unit 20 is not able to be accurately positioned. This is typically the result of an inability of a target mobile unit 20 to measure received signals as a result of, for example, multipath. This is the case in the example shown in FIG. 1. To overcome such situations, neighboring mobile units 18, 22, n whose positions are known may, in effect, each act as a second base station thereby providing a plurality of known reference points that may be used in conjunction with base station 16 to accurately position target mobile unit 20.

To employ neighboring mobile units 18, 22, n to provide positioning information for the target mobile unit 20, the system 10 orders each neighboring mobile unit 18, 22, n to provide an angle measurement ($\theta$) which allows the system 10 to more accurately compute an estimate of the position of the target mobile unit 20. Each reported angle measurement ($\theta$) is compiled by the system 10 and is available for use in computing the position of the target mobile unit 20. To order the neighboring mobile units 18, 22, n to provide an angle measurement ($\theta$) for the target mobile unit 20, the system 10 instructs each neighboring mobile unit 18, 22, n to separately measure a direction of arrival of a signal $28_{b-m}$ from the base station 16 and a direction of arrival of a signal $28_{m-m}$ from the target mobile unit 20.

In situations where an extremely high number of neighboring mobile units with known positions are in the vicinity of a target mobile unit, the neighboring mobile units employed to provide positioning information may be reduced. For example, where cells are sectorized, the system 10 may select neighboring mobile units that are in the same sector of the target mobile unit. In addition to reducing the amount of data that needs to be calculated, employing only those neighboring mobile units in the same sector as the target mobile unit increases the number of angle measurements ($\theta$) that will be properly reported to the system. Sectorized cells are simply provided as an example, as those skilled in the art realize that base stations have many ways with which to select and identify particular mobile units for performing particular functions.

Signals $28_{b-m}$ and $28_{m-m}$ may be characterized by a code, a time period, (i.e. a time slot), and a frequency, as desired. The signal characteristics are sent by the system 10 to the neighboring mobile units 18, 22, n and, if desired, a target mobile unit 20, so that they may identify which signals should be measured. Once both directions of arrival are measured, the angle measurement ($\theta$) between the two signals is measured and reported to the system 10 for processing. In addition to the angle measurement ($\theta$), the neighboring mobile units 18, 22, n may each measure and report the amplitude of the measured signals (i.e. for mobile unit 20, signals $28_{b-m}$ and $28_{m-m}$) as well as a degree of confidence in the angle measurement ($\theta$). The amplitude, for example, may be used by the RNC 12 to independently calculate a measure of reliability (i.e. confidence) of the reported angle measurement ($\theta$) to double check the degree of confidence reported by a particular mobile unit. Of course, if desired, the actual directions of arrival as measured by neighboring mobile units 18, 22, n may also be reported to the system 10.

To instruct each neighboring mobile unit 18, 22, n to measure and report the directions of arrival mentioned above, the system sends out messages to the neighboring mobile units 18, 22, n, as desired. For purposes of describing the invention, two separate messages are used (i.e. a first and second message), but the messages obviously may be combined into one message or similarly may be further divided. The message(s) may also contain instructions related to measuring and reporting propagation delay, amplitude, and degree of confidence. The first message orders the neighboring mobile units 18, 22, n, which are equipped with adaptive antennas to measure a direction of arrival of signal $28_{m-m}$ from the target mobile unit 20 for a predetermined duration. The second message orders the neighboring mobile units 18, 22, n to measure a direction of arrival of signal $28_{b-m}$ from a base station 16 so as to provide a reference for the angle measurement ($\theta$) taken between the two measured signals, $28_{m-m}$ and $28_{b-m}$. The base station 16 may be any base station in the system 10 as determined by the RNC 12. Once the neighboring mobile units 18, 22, n have performed the measurements on signals $28_{m-m}$ and $28_{b-m}$, the angle measurement ($\theta$), as well as any other information requested by the system 10, is reported.

It should be noted that mobile units served by base stations other than base station 16 may be used in the manner described above to collect additional angle measurements ($\theta$), as desired, regarding a particular target mobile unit. That is, although a single base station 16 is shown in FIG. 1, any number of base stations within system 10 may be used to collect angle measurements ($\theta$) for a particular target mobile unit. For example, assume that neighboring mobile unit 22 has a clear line of sight to the target mobile unit 20, but not a clear line of sight to base station 16. In that case, instead of measuring signal $28_{b-m}$, mobile unit 22 may measure a signal from any other base station from which it may receive signals and to which it has a clear line of sight. If, in this situation, there are no other base stations from which a signal may be measured, mobile unit 22 would be forced to use the obstructed signal from base station 16. The fact that the signal was obstructed will be reflected not only in the reported amplitude for that signal, but also the reported degree of confidence, as further explained below.

It should also be noted that additional angle measurements ($\theta$) may be measured for additional target mobile units as well. That is, angle measurements ($\theta$) may be simultaneously collected for more than one target mobile unit, as desired.

Once a sufficient amount of reported angle measurements ($\theta$) have been received for a particular target mobile unit 20, the system 10 compounds all of the measurements and computes the target mobile unit's position. To calculate a degree of confidence in the computed position, the system 10 may, for example, calculate the number of properly reported angle measurements ($\theta$). The higher the number of properly reported angle measurements ($\theta$), the higher the degree of confidence. It should be noted that the required amount of reported angle measurements ($\theta$) and the required level of confidence, are completely adjustable parameters that may be set as desired. Although the measurements from most neighboring mobile units 18, 22, n may be inaccurate, the large number of them make it likely that at least one of them will be in a good location with respect to a target mobile unit, allowing a significant improvement in the positioning accuracy in situations where severe multipath exists between a target mobile unit 20 and its serving base station 16.

To illustrate an example of how the system 10 may be implemented, reference is again made to FIG. 1. In FIG. 1, the target mobile unit 20 is locally surrounded by buildings 24, 26 and cannot obtain an accurate measurement of the direction of arrival between it and its serving base station 16, or to any other base station, because of multipath. Mobile unit 22, however, which is not subject to heavy multipath at its location, happens to be in clear view of both the target mobile unit 20 and the serving base station 16. Mobile unit 22 can therefore report an angle measurement (θ) between the target mobile unit 20 and the base station 16 and increase the accuracy of the positioning of the target mobile unit 20. The reported information related to the target mobile unit 20 may involve several other measurements such as those reported by neighboring mobile units 18 and n, all of which are evaluated by system 10. Pursuant to the present invention, even if multipath exists in the vicinity of base station 16 which makes it receive signals from mobile units from all directions, the measurement provided by neighboring mobile unit 22 will still be accurate since the angle measurement (θ) information is measured from mobile unit 22 and not base station 16.

In addition to the system 10 calculating a degree of confidence in a computed position, neighboring mobile units 18, 22, n may also be able to provide a degree of confidence with respect to the individual angle measurements (θ) that they provide. For example, neighboring mobile units who were able to properly measure a direction of arrival from the target mobile 20 and the base station 16 (see neighboring mobile unit 22 in FIG. 1), may transmit a signal indicative of that to the system 10. When the system 10 receives such a signal from a neighboring mobile unit, the system will know that the neighboring mobile unit is providing an angle measurement (θ) with good confidence. Alternatively, where a neighboring mobile unit is unable to properly measure one or more directions of arrival, the neighboring mobile unit may transmit a signal indicative of that to the system 10. When the system 10 receives such a signal from a neighboring mobile unit, the system 10 will know that the neighboring mobile unit is providing an angle measurement (θ) without good confidence. In this case, the system 10 may be adapted to only consider angle measurements (θ) that are reported with good confidence when calculating a degree of confidence for a computed position. This allows the degree of confidence for a computed position to be proportional to the number of angle measurements (θ) reported with good confidence for the computed position.

It is important to note that the reported information may also include information reported by the target mobile unit 20 itself. For example, the system 10 may utilize the propagation delay reported by the target mobile unit 20 in conjunction with angle measurement (θ), as reported by mobile unit 22, to compute the position of target mobile unit 20. In practice, however, even where an angle measurement (θ) is reported with good confidence, as with mobile unit 22, the actual angle measurement (θ) used by the system 10 to compute a target mobile unit's position may be a compilation of many reported angle measurements (θ).

Figure 2:
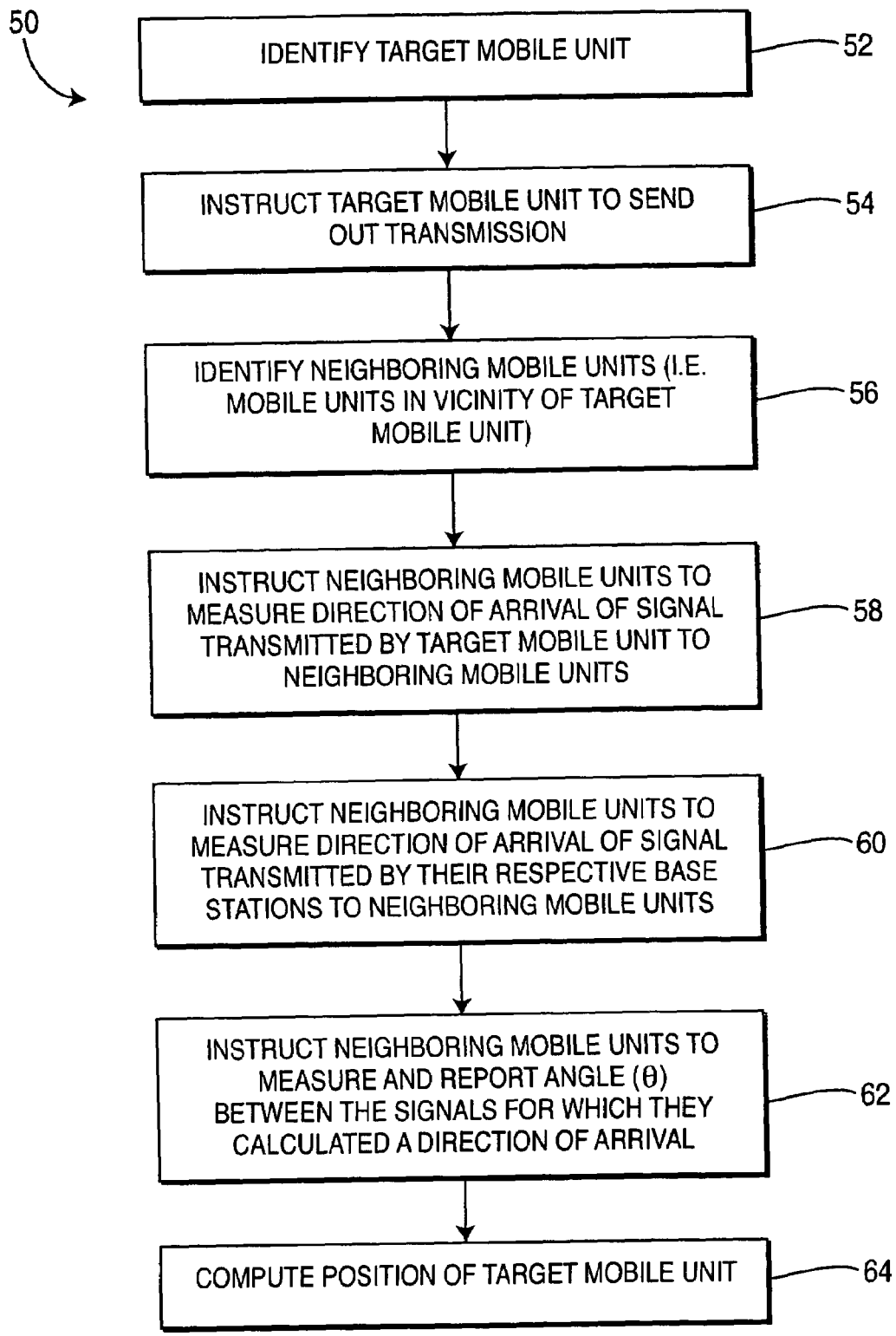
FIG. 2 is a method for positioning a mobile unit in accordance with an embodiment of the present invention.

Referring now to FIG. 2, there is shown a method 50 for positioning a mobile unit in accordance with an embodiment of the present invention. It should be noted that the method 50 may be used to obtain accurate positioning information on a particular mobile unit where that mobile unit is incapable of providing accurate positioning information. Similarly, the method may be used to simply confirm or double check, or supplement positioning information provided by a particular mobile unit in order to increase the probability of accurately positioning mobile units.

To begin, a target mobile unit is identified in step 52. By targeting a particular mobile unit, the method 50 is indicating that the position of the targeted mobile unit will be computed. The position of a targeted mobile unit may be desired for a wide variety of reasons. Positioning of mobile units is particularly important for providing various "location based" services commonly provided over wireless networks such as emergency 911 services, roadside assistance (included providing users with driving directions) and providing users with information about restaurants, hotels, banks, etc. in their vicinity. Positioning of mobile units may also be used by law enforcement purposes, for example, wherein criminal suspects or missing persons may be tracked by positioning their mobile unit.

Once a target mobile unit is identified for positioning, the method continues in step 54 by sending a signal from a base station to the identified mobile unit instructing it to send out a signal. (Note, this step may be bypassed where the target mobile unit is already transmitting or otherwise sending out a signal.) In step 56, mobile units within a predetermined geographic area of the target mobile unit are identified (i.e. neighboring mobile units). The neighboring mobile units are typically mobile units whose positions are known by the system and are in the vicinity of the target mobile unit. Such neighboring mobile units may, therefore, receive signals sent from the target mobile unit and provide an accurate reference point for computing the position of the target mobile unit. The position of neighboring mobile units is easily obtained as neighboring mobile units are typically identified as such, at least in part, because they clearly receive signals from the target mobile unit and at least one base station. As such, they are in a position to clearly measure directions of arrival from two base stations thereby allowing a system to accurately compute their position. Of course, the degree of accuracy with which a neighboring mobile unit is positioned may be reflected in the overall degree of confidence of any positioning information provided by that mobile unit.

In step 58, the neighboring mobile units are instructed to measure a direction of arrival for the signal sent out by the target mobile unit. Similarly, in step 60, the neighboring mobile units are instructed to measure a direction of arrival for the signal sent out by each neighboring mobile units' respective base station. The direction of arrival of the signal from the base station acts as a reference for measuring an angle (θ) between the two signals.

The respective base stations may or may not include the base station currently serving the target mobile unit. That is, there is no limit to the number of neighboring mobile units used to obtain positioning information regarding the target mobile unit. Therefore, it is quite foreseeable that some of the neighboring mobile units may be served by different base stations, with respect to each other and with respect to the target mobile unit. The number of base stations involved in obtaining information pertaining to a target mobile unit is proportional to the number of the neighboring mobile units instructed to provide information concerning the location of the target mobile unit.

Once directions of arrival have been calculated by the neighboring mobile units, each mobile unit measures and reports angle measurement (θ) between the two directions of arrival in step 62. In addition to the actual angle measurement (θ), each mobile unit may report the amplitude of the signals for which the directions of arrival were calculated as well as a degree of confidence in the reported angle measurement (θ). In step 64, the system compounds all of the reported information and computes a position for the target mobile unit, which may be used as desired. As known by those skilled in the art, the reported information may include any information related to the position of a mobile unit, as desired, and may be requested from not only the neighboring mobile units, but also from the target mobile unit itself.

Although particular processing functions have been described as being performed by particular components, it should be understood that performance of processing functions may be distributed among network components as desired. For example, the processing functions described as being performed at the RNC may be performed at the base station.

Although the present invention has been described in detail, it is to be understood that the invention is not limited thereto, and that various changes can be made therein without departing from the spirit and scope of the invention, which is defined by the attached claims.

What is claimed is:

1. A method for determining a position of a target mobile unit in a wireless communication system, the method comprising:
   identifying a neighboring mobile unit that is proximate to the target mobile unit and has a known location;
   receiving a signal from the target mobile unit at the identified neighboring mobile unit;
   measuring a direction of arrival of the received signal;
   receiving a signal from a base station at the identified mobile unit;
   measuring a direction of arrival of the signal received from the base station;
   calculating an angle between the signal received from the target mobile unit and the signal received from the base station; and
   determining the position of the target mobile unit using the calculated angle.

2. The method of claim 1 wherein the neighboring mobile unit receives the signal for the angle measurement from the base station while the neighboring mobile unit is communicating with a different base station.

3. The method of claim 1 further comprising generating a degree of confidence for each measurement, and using only measurements having a degree of confidence above a predetermined threshold to determine the position of the target mobile unit.

4. The method of claim 3 further comprising measuring an amplitude of the signals received from the target mobile unit and the base station, and using the measured amplitude to determine the position of the target mobile unit.

5. The method of claim 4 further comprising measuring a propagation delay of the signals received from the target mobile unit and the base station, and using the measured propagation delay to determine the position of the target mobile unit.

6. An apparatus for determining a position of a target mobile unit in a wireless communication system, the apparatus comprising:
   means for identifying a neighboring mobile unit having a known location that is capable of receiving a signal from the target mobile unit;
   means for transmitting an instruction to the identified neighboring mobile unit to measure a direction of arrival of a signal received from the target mobile unit;
   means for measuring a direction of arrival of a signal received from the target mobile unit;
   means for measuring a direction of arrival of a signal from a base station; and
   means for calculating an angle between a signal from the target mobile unit and a signal from the base station wherein the calculating means is configured to determine the position of the target mobile unit using the calculated angle.

7. The apparatus of claim 6 wherein the neighboring mobile unit is configured to receive a signal for performing the angle measurement from a base station while communicating with a different base station.

8. The apparatus of claim 6 further comprising means for instructing the neighboring mobile unit to generate a degree of confidence of angle of arrival measurements wherein the calculating means uses only measurements having a degree of confidence above a threshold to determine the position of the target mobile unit.

9. The apparatus of claim 8 further comprising means for instructing the neighboring mobile unit to measure an amplitude of signals received from the target mobile unit and the base station, wherein the calculating means uses measured amplitudes of received signals in determining the position of the target mobile unit.

10. The apparatus of claim 9 further comprising means for instructing the neighboring mobile unit to measure a propagation delay of signals received from the target mobile unit and the base station, wherein the calculating means uses measured propagation delay of received signals in determining the position of the target mobile unit.

* * * * *